United States Patent [19]

Meyer et al.

[11] 4,305,360

[45] Dec. 15, 1981

[54] ENGINE AUTOMATIC IDLE SPEED CONTROL APPARATUS

[75] Inventors: Paul M. Meyer; Richard D. Doerr, both of St. Louis; Steven R. Bollinger, Creve Coeur; Mark A. Jefferis, Webster Groves; Chusak Tansuwan, St. Louis, all of Mo.

[73] Assignee: ACF Industries, Inc., New York, N.Y.

[21] Appl. No.: 108,495

[22] Filed: Dec. 31, 1979

[51] Int. Cl.[3] .............................................. B60K 31/00

[52] U.S. Cl. .................................... 123/339; 123/340; 123/341

[58] Field of Search ............... 123/339, 340, 341, 349, 123/352, 363, 376, 393, 353, 354, 355, 356, 440, 325, 494, DIG. 11

[56] References Cited

U.S. PATENT DOCUMENTS

| | | | |
|---|---|---|---|
| 3,648,798 | 3/1972 | Jania | 123/352 |
| 3,767,972 | 10/1973 | Noddings et al. | 123/352 |
| 4,128,087 | 12/1978 | Hayashi et al. | 123/DIG. 11 |
| 4,132,199 | 1/1979 | Kuroiwa et al. | 123/440 |
| 4,173,956 | 11/1979 | Ikoura et al. | 123/440 |
| 4,174,689 | 11/1979 | Hosaka | 123/440 |
| 4,223,654 | 9/1980 | Wessel et al. | 123/340 |
| 4,237,833 | 12/1980 | Des Lauriers | 123/339 |
| 4,237,838 | 12/1980 | Kinugawa et al. | 123/339 |
| 4,245,603 | 1/1981 | Pomerantz | 123/440 |

*Primary Examiner*—Raymond A. Nelli
*Attorney, Agent, or Firm*—J. Joseph Muller

[57] ABSTRACT

Apparatus for automatically controlling the idle speed of an internal combustion automobile engine. A sensor senses the operating speed of the engine and develops an electrical signal representative thereof. Movement of a carburetor throttle valve from an open to a substantially closed position is sensed and an electrical signal indicative thereof is generated. Closure of the throttle valve indicates the engine is operating at idle. A controller is responsive to the second electrical signal to process the electrical signal from the sensor and generate an electrical control signal. The controller processes the electrical signal from the sensor means in accordance with a predetermined format based upon a transfer function derived for the engine. An electromechanical device is responsive to the control signal for moving the throttle valve to a desired position at which engine idle speed is a preselected speed determined in accordance with the transfer function.

21 Claims, 7 Drawing Figures

ENGINE AUTOMATIC IDLE SPEED CONTROL APPARATUS

BACKGROUND OF THE INVENTION

This invention relates to control of internal combustion automobile engines, and more particularly to automatically controlling the idle speed of such an engine.

Because of present federal and state government rules and regulations, much work is being done in the automobile industry to control various aspects of automobile engine operation. Two major areas of work are fuel management and engine emissions. The former seeks to improve fuel economy while the latter attempts to reduce exhaust pollutants. Numerous control schemes have been employed to achieve both these goals (see, for example, U.S. Pat. No. 4,150,645 to Berent; U.S. Pat. No. 4,056,936 to Nakamura et. al; U.S. Pat. No. 3,963,009 to Mennesson; U.S. Pat. No. 3,738,341 to Loos) while at the same time retaining good engine driveability characteristics.

A common feature in most, if not all, of the various schemes is the controlling of the air-fuel ratio of a mixture produced in a carburetor or similar charge forming device and combusted in an engine. It is the conventional wisdom that by controlling air-fuel ratio for a wide range of engine operating conditions both improved fuel economy and reduced emissions are attained.

One portion of the range of engine operating conditions now being considered for control is engine idle speed. It is known that engine idle speed varies depending upon certain conditions; i.e. is the engine cold when first started; is the engine subjected to a load such as air conditioning while idling; does the engine run on (diesel) when shut down, etc.

Automatic engine idle speed control has two major benefits. First, it permits engine idle speed to be set lower than previously thus increasing fuel economy. Second, automatic idle speed control effectively tamperproofs the idle speed control of a carburetor thus preventing the idle speed setting from being adjusted after the engine has left the factory. Tamperproofing of various portions of a carburetor is a federal requirement for future automobile engines and the idle speed adjustment of a carburetor is one of the things required to be tamperproofed.

Until now, most automatic idle speed control schemes have employed a proportional control approach. That is, the system employed immediately responds to a sensed change in idle speed to attempt a correction back to a desired idle speed. While this approach permits some control over idle speed, it has problems. For example, not all engines operate the same way. That is, a four-cylinder engine responds differently than a six or eight-cylinder engine as does an in line engine from a V-engine. As a result, a system which is designed to produce satisfactory control over one type of engine is incapable of producing satisfactory control over a different type engine. What is needed is a single system capable of operating with a wide range of engines to obtain satisfactory idle speed control for each without a major modification being required to accomodate the system to each separate engine.

SUMMARY OF THE INVENTION

Among the several objects of the present invention is the provision of apparatus and a method for automatically controlling the idle speed of an internal combustion automobile engine; the provision of such apparatus which controls engine idle speed during engine start-up, hot and cold engine idle, and engine shut off; the provision of such apparatus to further control engine idle during engine decelerations (dash-pot) and for various engine load conditions; the provision of such apparatus which is accomodated substantially without change on various types of automobile engines, and which provides good idle speed control on each; and, the provision of such apparatus which provides fast response to changes in engine operation to adjust engine idle speed to compensate for such changes thus to maximize engine fuel economy.

Briefly, apparatus of the present invention automatically controls the idle speed of an internal combustion automobile engine. The engine has a carburetor for producing an air-fuel mixture combusted in the engine. The carburetor has an air passage through which air is drawn into the engine and a throttle valve for controlling the quantity of air so drawn. The engine further has an exhaust system for exhausting the products of combustion. The apparatus comprises sensing means for sensing the operating speed of the engine at any one time and for developing an electrical signal representative thereof. Switch means senses movement of the throttle valve from an open to a substantially closed position and generates an electrical signal indicative thereof. Closure of the throttle valve indicates the engine is operating at idle. A controller is responsive to the electrical signal from the switch means for processing the electrical signal from the sensing means and for generating an electrical control signal. The controller means processes the electrical signal from the sensing means in accordance with a predetermined format based upon a transfer function derived for the engine. Electromechanical means responsive to the control signal moves the throttle valve to a desired position at which engine idle speed is a preselected speed determined in accordance with the transfer function.

As a method, the present invention automatically controls the idle speed of an internal combustion automobile engine having a carburetor for producing an air-fuel mixture combusted in the engine. The carburetor has an air passage through which air is drawn into the engine and a throttle valve for controlling the quantity of air so drawn. The engine further has an exhaust system for exhausting the products of combustion. The method comprises the steps of sensing the operating speed of the engine and developing an electrical signal representative thereof; sensing movement of the throttle valve from an open to a substantially closed position and generating an electrical signal indicative thereof; sensing movement of the throttle valve indicating the engine is operating at idle; processing the electrical signal representing engine speed in accordance with a predetermined format based upon a transfer function derived for the engine and generating an electrical control signal, the processing being done in response to the electrical signal indicating throttle valve closure; and moving the throttle valve to a desired position at which engine idle speed is a preselected speed determined in accordance with the transfer function, throttle valve movement being done in response to the electrical control signal. Other objects and features will be in part apparent and in part pointed out hereinafter.

DESCRIPTION OF A PREFERRED EMBODIMENT

Figure 1:
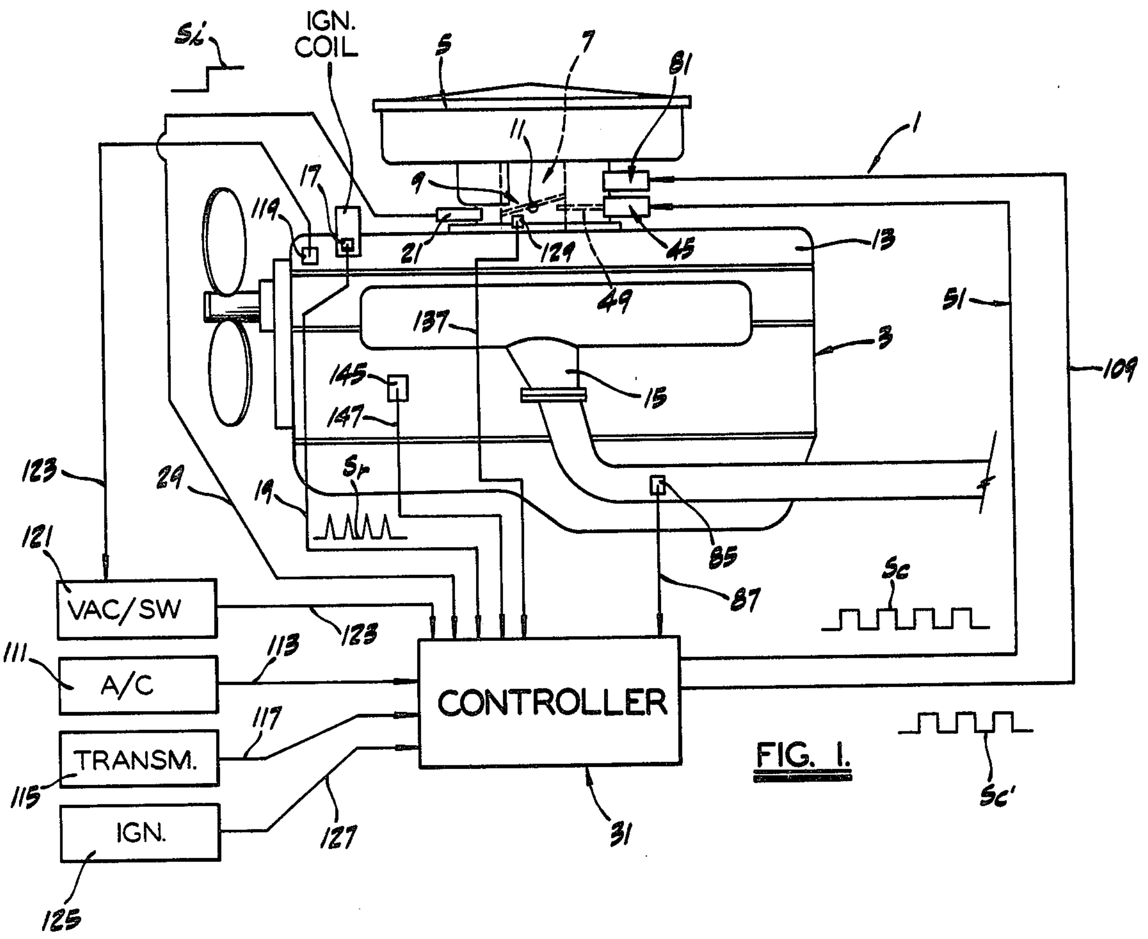
FIG. 1 is a block diagram representative of the apparatus of the present invention.

Referring to the drawings, apparatus of the present invention is indicated generally 1 and is for automatically controlling the idle speed of an internal combustion engine 3. A carburetor 5 is mounted on engine 3 and produces an air-fuel mixture combusted in the engine. Carburetor 5 has an air passage 7 through which air is drawn into engine 3 and a throttle valve 9 positioned at the lower end of passage 7 controls the quantity of air drawn into the engine. The throttle valve is a disc mounted on a throttle shaft 11 which rotates to open and close the throttle valve and admit more or less air into the engine. Engine 3 also has an intake manifold 13 by which the air-fuel mixture produced by carburetor 5 is distributed to various cylinders of the engine for combustion. The engine further has an exhaust system 15 by which combustion products are exhausted from the engine.

Apparatus 1 comprises a sensor 17 for sensing the operating speed of engine 3 at any one time. Sensor 17 senses the revolutions per minute (r.p.m.) of engine 3 and develops an electrical signal Sr (see FIGS. 1 and 3) representative of engine speed. In particular, sensor 17 includes an electrical pick-up from the negative side of the ignition coil (not shown) for engine 3. For each revolution of the engine two pulses are produced. The time interval between each pair of pulses comprising signal Sr is representative of the engine speed. It will be understood that as engine speed increases, the time interval between pulses decreases while if engine speed decreases, the time interval increases. The electrical signal developed by sensor 17 is applied to a line 19.

Figure 2:
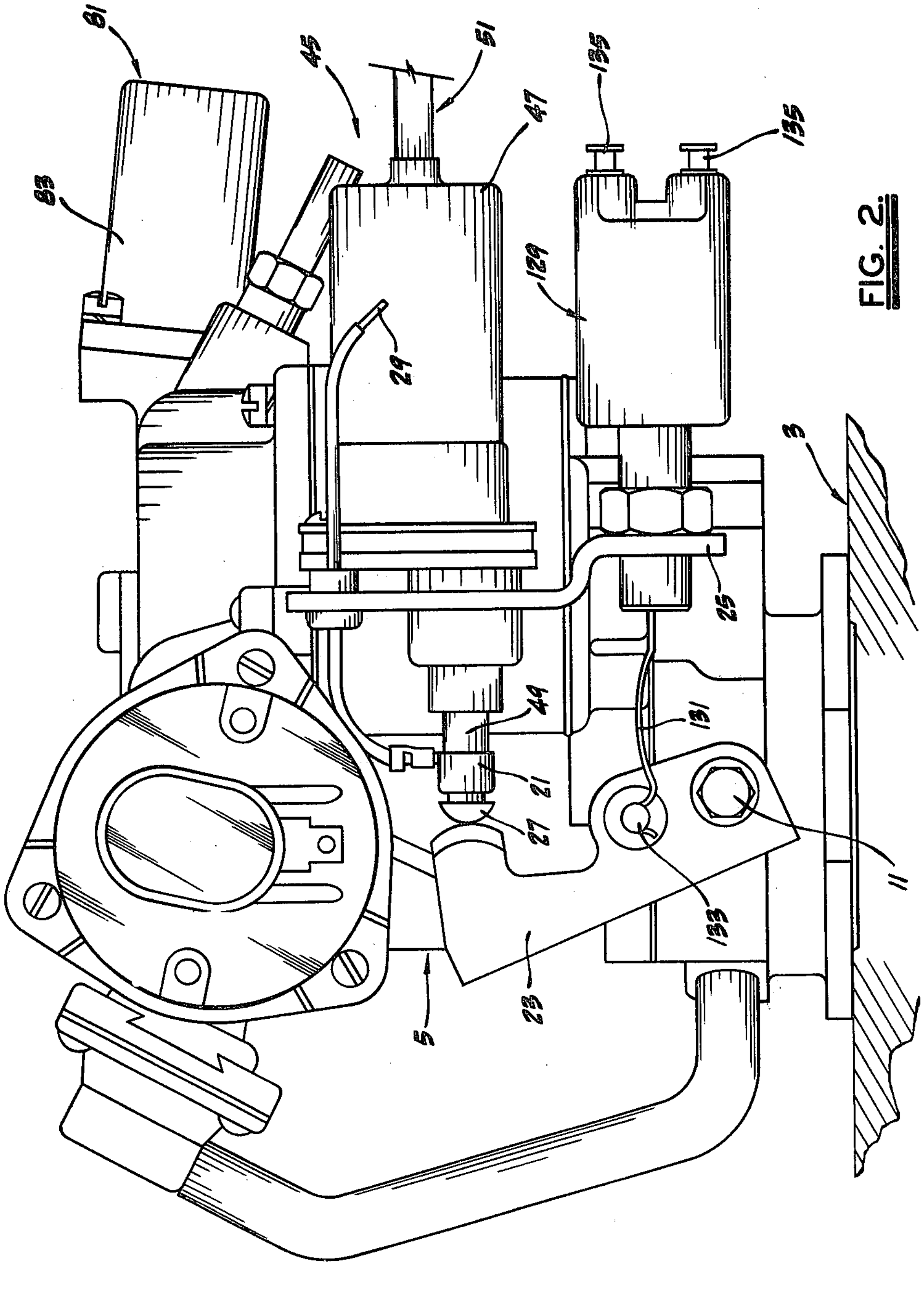
FIG. 2 is a side elevational view of a carburetor illustrating a portion of the apparatus of the present invention.

A switch 21 senses movement of throttle valve 9 from an open to substantially closed position and generates an electrical signal $S_i$ indicative of throttle valve closure. Referring to FIG. 2, a throttle lever 23 is secured to the outer portion of one end of throttle shaft 11. Throttle lever 23 rotates with the throttle lever as the throttle valve is opened and closed (the throttle lever rotating counterclockwise as the throttle valve opens and clockwise as the throttle valve closes). Switch 21 is mounted on a bracket 25 which is secured to the body of carburetor 5. The switch has an actuator arm 27 which extends forwardly from the switch and contacts the throttle lever. The switch has an output lead 29 to which signal $S_i$ is applied. As the throttle valve closes, lever 23 pushes arm 27 to the right as viewed in FIG. 2 and actuates switch 21. The switch remains actuated so long as the throttle valve remains substantially closed.

It should be understood that engine 3 is considered to be in an idling or idle state so long as the engine is running and the throttle valve is substantially closed. During this period, engine 3 is essentially subjected to no load and it is desirable that engine speed during this period be as slow as possible. It is further desirable that the speed at which the engine idles vary only as much as is necessary to keep the engine running when, for example, a load, such as the air conditioning system for the vehicle in which the engine is installed, is applied to the engine.

Figure 3:
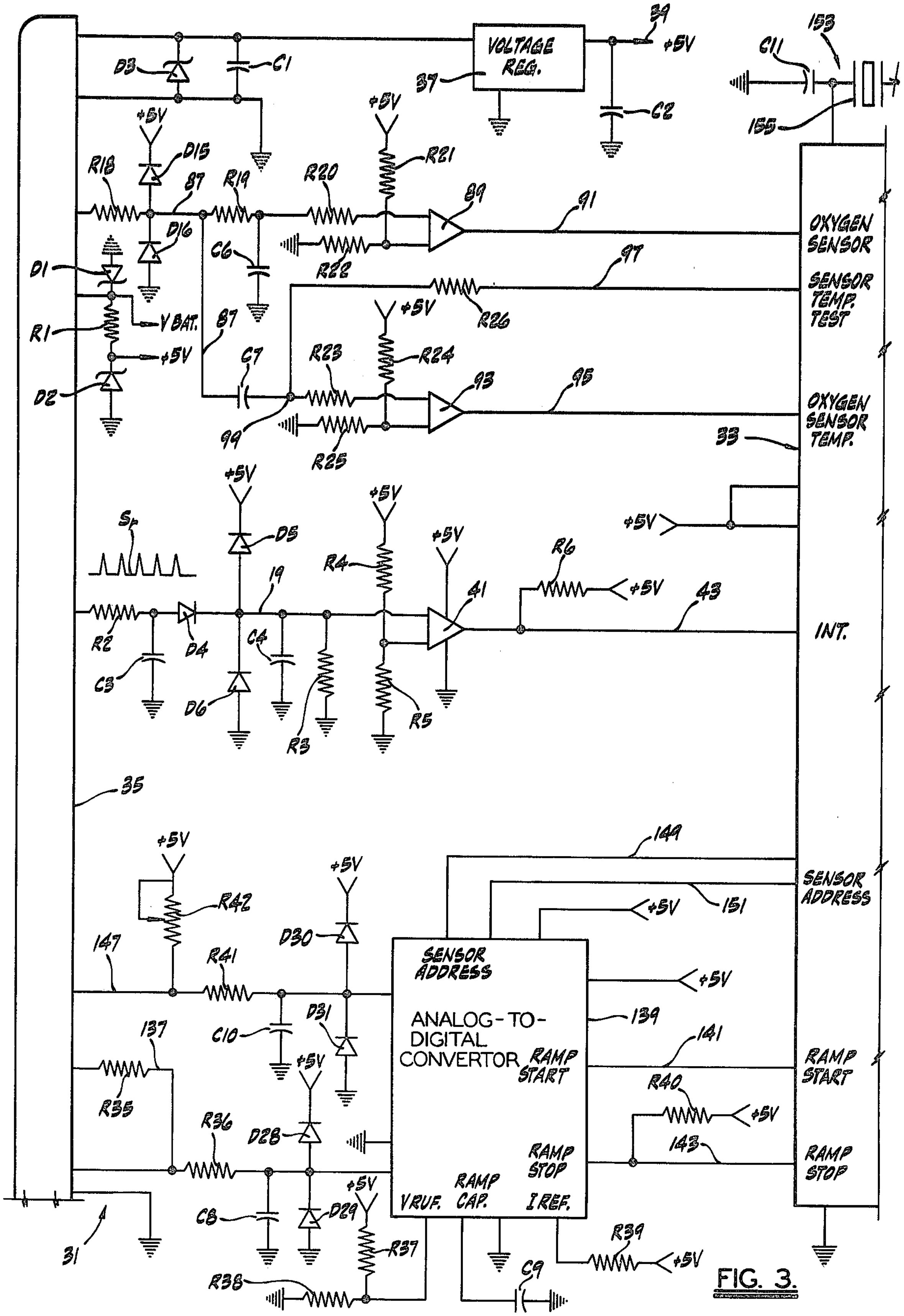
FIGS. 3 and 4 are schematics of electrical circuitry comprising a portion of the apparatus of the present invention.
Figure 4:
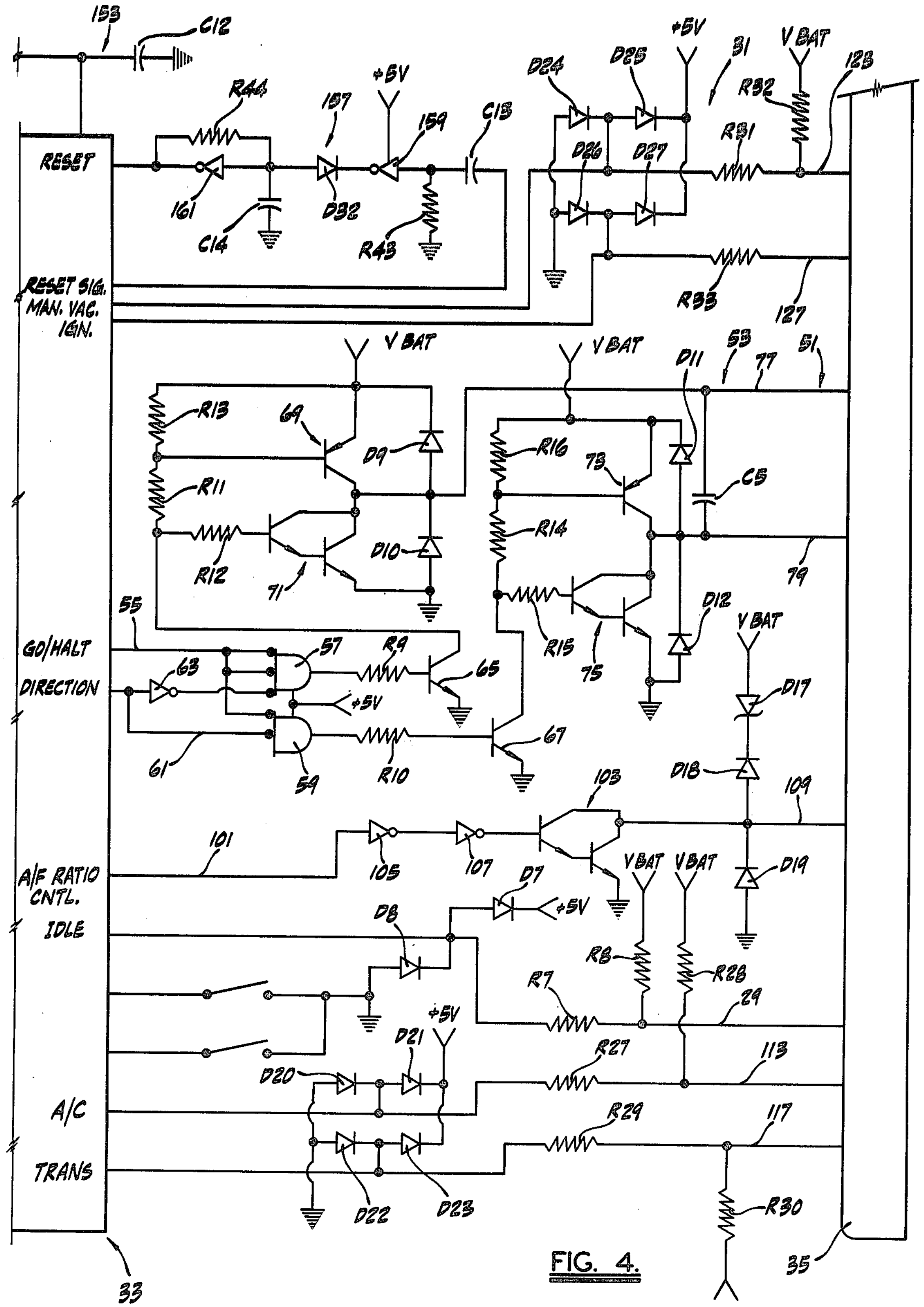

Apparatus 1 further includes a controller indicated generally 31 in FIGS. 1, 3, and 4. The controller is responsive to the electrical signal from switch 21 to process the electrical signal from r.p.m. sensor 17 and generate an electrical control signal $S_c$. Controller 31 processes the electrical signal from sensor 17 in accordance with a predetermined format based upon a transfer function derived for engine 3. For this purpose, controller 31 includes a microprocessor 33 which is, for example, manufactured by Intel Corporation of Santa Clara, Calif. under their model designation 8048. The microprocessor and other circuit elements comprising controller 31 are suitably housed in an appropriate receptacle which is located, for example, under the dashboard of a vehicle in which apparatus 1 is installed.

The signal input and control output lines to and from controller 31 are routed through a suitable multipin connector 35. Power for controller 31 is taken from both the battery of the vehicle and the vehicle's ignition system. The circuit path for the former includes a pair of zener diodes D1 and D2 connected in parallel to each other and in parallel with a resistor R1. This circuit provides 5 volts d.c. for the controller and is used to power the controller when the vehicle's ignition system is off. The latter circuit includes a zener diode D3 connected in parallel with a filter capacitor C1. A voltage regulator 37 is supplied voltage via these circuit elements and produces a 5 volt d.c. bus voltage for the controller on a bus line 39. A filter capacitor C2 is connected bewteen this bus line and electrical ground. Controller 31 power is provided by this circuit when the vehicle ignition system is on.

Circuit path 19 from sensor 17 includes a resistor R2 and a capacitor C3 connected in parallel. These form a first filter for signal $S_r$. A diode D4 acts a blocking diode while a pair of diodes D5 and D6 are connected in series between a voltage source and electrical ground and in parallel with circuit path 19. These latter two diodes act as signal limiters to limit the amplitude of the pulses comprising electrical signal $S_r$. A second filter comprised of a parallel connected resistor R3 and a capacitor C4 further filter signal $S_r$. By filtering signal $S_r$ twice, any ringing is eliminated.

Signal $S_r$ is applied to one input of an operational amplifier (op-amp) 41 which functions as a comparator. A pair of resistors R4 and R5 form a voltage divider network to develop a reference voltage level applied to the other input of the op. amp. Op. amp. 41 is of the open collector type and a pull-up resistor R6 is connected in parallel with the output of the op-amp to develop its output signal. This signal is supplied to an interrupt (INT) input of the microprocessor on a line 43.

Circuit path 29 from switch 21 includes a current limiting resistor R7 (see FIG. 4) connected in parallel with a resistor R8. A pair of series connected diodes D7 and D8 are connected in parallel with the circuit path and act as clamping diodes. Signal $S_i$ is applied on line 29 to an input IDLE of the microprocessor.

Apparatus 1 further includes an electromechanical device designated generally 45 for moving throttle valve 9 in response to a control signal $S_i$ from controller 31. As shown in FIG. 2, device 45 is a d.c. motor 47 mounted on bracket 25 and having an extendable and retractable armature 49. Armature 49, when extended (or moved to the left as shown in FIG. 2) acts against the upper end of throttle lever 23 to rotate the throttle lever counterclockwise and open throttle valve 9. If the throttle valve is already open, the position of armature 49 limits the extent to which the throttle valve closes by limiting the degree of clockwise movement of the throttle lever when the throttle valve moves to a substantially closed position. In either situation, the idle speed of engine 3 is controlled by the extent to which throttle valve 9 is closed when the engine is idling. Thus, by adjusting the position of armature 49, the idle of engine 3 is controlled.

Control signal $S_i$ is supplied to solenoid 47 over a pair of control lines designated generally 51 (See FIGS. 1, 2, and 4). Controller 31 includes a transistor bridge 53 responsive to digital output signals from microprocessor 33 for generating the control signal. Referring to FIG. 4, microprocessor 33 has a first output designated GO/HALT and a second output designated DIRECTION. Based upon the control format stored in the memory and in response to signal $S_i$, the microprocessor processes signal $S_r$. If it is determined that armature 49 of d.c. motor 47 needs to be moved in one direction or the other to control engine 3 idle speed, a first digital electric signal is supplied from the GO/HALT output of the microprocessor, on a line 55, to two inputs of a NOR gate 57, and to one input of a NOR gate 59. Simultaneously, a second digital signal is supplied from the DIRECTION output of the microprocessor, on a line 61, to a second input of gate 59 and via an inverter 63 to a third input of gate 57. The logic output of each gate is applied to the base of an NPN transitor (65 and 67 respectively) through a resistor (R9 and R10 respectively).

Logic gates 57 and 59 function as decoders to determine both when solenoid 47 is actuated and in which direction the armature 49 of the solenoid is driven when the solenoid is actuated. The collector of transistor 65 is connected to the base of a PNP transistor 69, through a resistor R11, and, through a resistor R12, to the base of one NPN transistor of a Darlington-pair of transistors 71. A resistor R13 is connected between the base of transistor 69 and a voltage source. Similarly, the collector of transistor 67 is connected to the base of a NPN transistor 73, through a resistor R14, and, through a resistor R15, to the base of an NPN transistor of a Darlington-pair of transistors 75. A resistor R16 is connected between the base of transistor 73 and a voltage source. All the transistors have protection diodes, D9 through D12 respectively, connected across their emitter-collector terminals.

Control line 51 includes a line 77 which is connected to the junction between the collector of transistor 69 and the common collectors of the transistors comprising Darlington transistor 71. The control line further includes a line 79 connected to the junction of transistor 73 and the common collectors of the transistors comprising Darlington transistor 75.

Operation of d.c. motor 47 is such that when line 77 is high with respect to line 79, i.e. when the voltage level on the line is higher than the voltage level on the other line, armature 49 of the motor is extended. When line 79 is high with respect to line 77, the armature is retracted. When both lines are equal there is no movement of the armature. The first condition occurs when the logic output of gate 57 is high while the logic output of gate 59 is low. In this instance, transistor 65 is turned on with the result that transistor 69 is on, while Darlington transistor 71 is turned off. Simultaneously, transistor 67 is off with the result that transistor 73 is turned off while Darlington transistor 75 is turned on. For the second condition, the reverse occurs with the logic output of gate 57 being low, transistor 65 being off, transistor 69 being off and Darlington transistor 71 being on. At the same time, the logic output of gate 59 is high, transistor 67 is on, transistor 73 is on and Darlington transistor 75 is off. A filter capacitor C5 is connected between lines 77 and 79 as is a resistor R17 (which is connected in series with a pair of parallel connected diodes D13 and D14). These latter elements serve to clamp the voltage difference between lines 77 and 79 to a relatively fixed value regardless of which line is higher.

The apparatus of the present invention is useful in conjunction with a device for controlling the air-fuel ratio of the mixture produced in carburetor 5 and combusted in engine 3. Referring to FIGS. 1 and 2, a servomechanical 81 comprises a solenoid 83 which is attached to carburetor 5. Solenoid 83 is described in co-pending application Ser. No. 108,497 filed Dec. 31, 1979, and assigned to the same assignee as the present application. As described therein, solenoid 83 is responsive to a second control signal $S_c'$ generated by controller 31. The solenoid controls the flow of bleed air into the main and idle fuel passages of carburetor 5 to control the resultant vacuum signal on each flow passage.

An oxygen sensor 85 is located in exhaust system 15 of engine 3. Sensor 85 senses the oxygen content in the products of combustion exhausted from the engine and generates an electrical signal supplied to controller 31 on a line 87. Referring to FIG. 3, line 87 includes a series resistors R18, R19, and R20 and a parallel connected filter capacitor C6. Diodes D15 and D16 forming a clamping circuit as previously described. The signal on line 87 is applied as one input to an op.-amp. 89 which functions as a comparator. A voltage divider comprised of resistors R21 and R22 develops a reference voltage which is applied to the other input of op.-amp. 89. The output of op-amp 89 is applied on a line 91 to an oxygen sensor input of microprocessor 33.

When engine 3 is first started, oxygen sensor 85 is cold. At this time, the signal supplied to microprocessor 33 on line 91 is not processed. The signal supplied to controller 37 on line 87 is also supplied as one input to an op.-amp. 93 via an in-line capacitor C7 and a resistor R23. A voltage divider network comprised of a pair of resistors R24 and R25 develops a reference voltage applied to the other input of op-amp- 93. The logic output of the op-amp is applied to an oxygen sensor temperature input of microprocessor 33 on a line 95.

The microprocessor is programmed to test the impedance of the oxygen sensor to determine if the sensor is sufficiently heated so the signal supplied to controller 31 on line 87 can be processed. For this purpose, microprocessor 33 periodically makes a line 97 high. This line includes a series resistor R26 and connects to line 87 at a node 99. The impedance of oxygen sensor 85 is temperature dependent. When the sensor is cold, its impedance is high. As the sensor heats up, after engine 3 is started, the impedance of the sensor falls off. It has been found that the signal generated by the oxygen sensor should not be processed until it has been determined that the oxygen sensor has reached a predetermined temperature. Initially, the logic output of op-amp 93 is high. Whenever the line 97 goes high, the microprocessor investigates the input to it on line 95 from op-amp 93. If the input remains high, it indicates that sensor 85 has not yet reached its predetermined operating temperature and the input to the microprocessor on line 91 is disregarded. When, however, the input from op-amp 93 goes low after line 97 goes high, it indicates that sensor 85 has reached its operating temperature and microprocessor 33 begins processing the input to it from op-amp 89. In effect, a voltage divider network is created with one branch of the network including sensor 85 and line 87, this branch being a variable impedance which changes as the sensor heats up.

The control signal to solenoid 83 is supplied from an output of microprocessor 33 designated A/F RATIO CNTL on a line 101. This signal is supplied to a Darlington-type transistor 103 through inverters 105 and 107. Transistor 103 acts as a power amplifier and the signal produced thereby is supplied to solenoid 83 on a line 109 (see FIGS. 1 and 4). When a signal to solenoid 83 terminates, a voltage spike is generated by the coil of the solenoid. To protect the circuitry of controller 31, a zener diode D17 and a second diode D18 are connected between a voltage source and the output of transistor 103. Further, a diode D19 is connected between the transistor output and electrical ground. Diodes D17, D18, and D19 clamp the voltage spike produced by the collapsing field in the coil of solenoid 83 to, for example, 40 volts. Further, these diodes reduce the time it takes for the field to collapse so solenoid 83 can be operated at a fast rate.

The output circuit just described can also be used, for example, to control the venting of a charcoal canister (not shown) in which fuel vapors are collected, or a manifold heater (also not shown). In either instance, the operation of the circuit is the same.

Apparatus 1 is designed to automatically control the idle speed of engine 3 during cold and hot starts off the engine, warm engine idle, dashpot or decelerations and engine shutoff to prevent dieseling or run-on. For each of these situations, the idle speed of the engine is controlled by moving armature 49 of d.c. motor 47 so to either move throttle lever 23 in the direction to open throttle valve 9 or prevent movement of the throttle lever and hence the throttle valve in the throttle valve closing direction. The precise speed at which engine 3 should idle varies. Thus, for example, the idle speed of the engine may be lower when the engine is warm than when it is cold. Further, the load to which the engine is subjected during idle may change and the idle speed of the engine is adjusted accordingly. Regardless of the situation, the apparatus maintains the idle speed at a level low enough to conserve fuel and the same time high enough to prevent the engine from dying. The former is advantageous in that it helps increase fuel economy while the latter helps reduce emissions. In addition, apparatus 1 replaces the conventional idle adjustment mechanisms of previous carburetion systems. Because the optimum idle speed is automatically controlled, one cannot tamper with the apparatus to reset the idle speed to a different speed than that determined by microprocessor 33 in accordance with the transfer function derived for the engine and stored in the microprocessor.

Referring to FIG. 1, the vehicle in which apparatus 1 is installed may include an air conditioner. If the air conditioner is turned on while engine 3 is idling, the load on the engine is increased and the engine idle speed must be increased to prevent the engine from dying. The apparatus thus includes an air-conditioner switch 111 which is actuated when the engine is turned on. Actuation of switch 111 generates an electrical signal supplied to controller 31 on on a line 113 (see FIGS. 1 and 4). Line 113 includes a series connected resistor R27 and a pair of voltage clamping diodes D20 and D21 connected between a source of voltage and electrical ground in parallel with the signal line. A resistor R28 is connected between a source of voltage and the signal line. The signal from switch 111 is applied to an A/C input of microprocessor 33. When this signal is received by the microprocessor, the microprocessor uses this information in processing signal Sr. As a result from this processing operation, the microprocessor commands d.c. motor 47 to extend armature 49 and open throttle valve 9. Conversely, if the vehicle air conditioner is on while the engine is idling but is then turned off, switch 111 is deactuated and the signal applied to the A/C input of microprocessor 33 is terminated. In response to the termination of the signal from swithc 111, the microprocessor commands d.c motor 47 to retract armature 49. This permits throttle valve 9 to move to a more fully closed position. In each instance, the idle speed of engine 3 is maintained at a predetermined speed.

The vehicle in which apparatus 1 is installed may also have an automatic transmission which, when engaged, puts another load on engine 3. A switch 115 (see FIG. 1) is actuated when the transmission is engaged (i.e. placed in a position other than neutral or park). Actuation of switch 115 creates a signal which is supplied to controller 31 on a line 117. Line 117 includes a series resistor R29 and a pair of voltage clamping diodes D22 and D23 connected as previously described as is a resistor R30. The signal applied to line 117 is supplied to an input of microprocessor 33 designated TRANS. As before, the signal from switch 115, when received by microprocessor 33, is used as information by the microprocessor in processing signal $S_r$.

It sometimes happens that vacuum level in manifold 13 of engine 3 fluctuates during engine idle. If the transient change is severe enough, the engine may die. To prevent this, a vacuum pressure sensor 119 is located in the manifold. The sensor develops a signal representative of manifold vacuum which is supplied to a switch 121 on a line 123. Switch 123 is preset to actuate when manifold vacuum, as sensed by sensor 119, falls below a certain level. Actuation of switch 123 generates an electrical signal which is supplied to controller 31 on a line 123. Line 123 includes a series connected resistor R31, clamping diodes D24 and D25 connected as previously described and a resistor R32 also connected as previously described. The signal generated by switch 123 is supplied to an input of microprocessor 33 designated MAN. VAC. Microprocessor 33, in response to a signal from switch 121, generates a command signal to d.c. motor 47 to extend armature 49. This results in throttle valve 9 being moved to a more open position. When manifold vacuum returns to its normal engine level, switch 121 is deactuated and the signal from it to controller 31 is terminated. The microprocessor, in response to the termination of the signal commands the d.c. motor to retract armature 49 back to its prefluctuation position thus allowing the throttle valve to more fully close. The overall result is an immediate response to a transient situation to maintain engine 3 at a near normal idle thus preventing the engine from dying.

Another important function of apparatus 1 is to prevent engine run-on or dieseling when the ignition system for the engine is turned off. A switch 125 is responsive to shut off of the ignition system to generate an electrical signal supplied to controller 31 on a line 127. Line 127 includes a series connected resistor R33 clamping diodes D26 and D27 connected as previously described and a resistor R34 also connected as previously described. The signal generated by switch 125 is applied to an input of microprocessor 33 designated IGN. The microprocessor is responsive to this signal to command d.c. motor 47 to fully retract armature 49. This permits throttle valve 9 to fully close and effectively prevents engine run-on. This does not always occur with conventional carburetors where the fast idle cam of the carburetor may prevent the throttle valve from fully closing. If the throttle valve does not fully close, air continues to be sucked into the engine and it may keep running. Since apparatus 1 and in particular, d.c. motor 47 of the apparatus replaces the fast idle cam or similar components this cannot occur.

In addition to the above, it is also desirable to sense the position or throttle angle of throttle valve 9. For automatic idle speed control, sensing of throttle position, in effect, closes the loop for the system. Thus sensing of throttle angle permits determination of the working of d.c. motor 47. That is, if microprocessor 33 commands extension or retraction of armature 49, sensing of throttle position will indicate if the throttle valve did move as a result of the command. Further, throttle position or angle is a function of the load on engine 3 and therefore engine load can be calculated if throttle position is known.

Apparatus 1 includes a throttle position sensor 129 (see FIGS. 1 and 2) which is, for example, a potentiometer mounted on bracket 25. Sensor 129 has a movable arm 131 which is attached to throttle lever 23 by a pin 133. As throttle valve 9 opens and closes, movement of throttle lever 23 moves arm 131 to change the resistance of the sensor. Sensor 129 has a pair of terminals 135 by which an analog electrical signal is supplied to controller 31 on a line 137 (see FIGS. 1 and 3). Line 137 is connected to one input of a multi-input analog-to-digital converter 139 via series resistor R35 and R36. A filter capacitor C8 is connected in parallel with line 137 as are a pair of clamping diodes D28 and D29. In order to convert the analog electrical signal from sensor 129 to a digital signal usable by microprocessor 33, the microprocessor generates a ramp start signal supplied to converter 139 via a line 141. The converter is supplied a voltage reference via a voltage divider comprised of resistors R37 and R38. A resistor R39 produces a current reference for the converter and a capacitor C9 acts as a ramp capacitor. Converter 139 functions as is well known in the art to convert the analog signal from sensor 129 to its digital equivalent when a ramp start signal is received. When the conversion is finished, converter 139 generates a ramp stop signal which is supplied to microprocessor 33 on a line 143. A pull-up resistor R30 is connected in parallel with line 143. As discussed above, microprocessor 33 utilizes the resultant digital information to determine if d.c. motor 47 is functioning in response to command signals sent it by controller 31.

Apparatus 1 also includes sensor 145 for sensing the water temperature in engine 3. Sensor 145 develops an analog electrical signal representative of water temperature and this signal is supplied controller 31 on a line 147. Line 147 is connected to second input of analog-to-digital converter 139 via a series resistor R41. A potentiometer R42 is connected in parallel with line 147 as is a filter capacitor C10 and a pair of clamping diodes D30 and D31. Operation of converter 139 to convert the analog signal from sensor 145 to its digital equivalent is the same as previously described. Because converter 139 converts analog signals from more than one sensor, microprocessor 33 must know which sensor's signal is being converted in order to correctly use the resultant digital information during processing. For this purpose, two address lines 149 and 151 are used to transmit a coded address signal between the converter and the microprocessor. The information transmitted to the microprocessor via these address lines are decoded by the microprocessor and inform it which sensor developed the analog signal presently being converted. As for the analog signal developed by water temperature sensor 145, the information represented by it is used to determine the speed at which engine 3 idles since idle speed can be a function of engine temperature.

The operating frequency of microprocessor 33 is established by an oscillator indicated generally 153. Oscillator 153 comprises a crystal 155 connected in parallel with a capacitor C11 (see FIG. 3) and a capacitor C12 (see FIG. 4). Operation of oscillator 153 is well known in the art and the oscillator has a frequency which is, for example, 4MHZ. In addition, the microprocessor has an associated reset circuit 157 (see FIG. 4). This circuit is used to reset the microprocessor both at engine start up and periodically when the engine is running. Circuit 157 includes a capacitor C13 connected in parallel with a resistor R43 which is connected to electrical ground. The capacitor is also connected to an inverter 159. The cathode of a diode D32 is connected to the output of inverter 159 and the anode of the diode is connected in turn to the input of an inverter 161. The output of this inverter is connected to the reset input of microprocessor 33. A resistor R44 is connected across the input and output of inverter 161 and a capacitor C14 is connected between the input of the inverter and electrical ground. A logic high is applied to circuit 157 from an output of microprocessor 33 designated RESET S16. This logic high is applied to the input of inverter 159 for a period determined by the time constant of capacitor C13 resistor R43. The logic output of inverter 159 during this period is low which permits diode D32 to conduct. This makes the logic input to inverter 161 low and a logic high is applied to the reset input of microprocessor 33 from the output of this inverter. The time period for which the logic high is applied to the reset input of the microprocessor is determined by the time constant of resistor R44 and capacitor C14.

Figure 5:
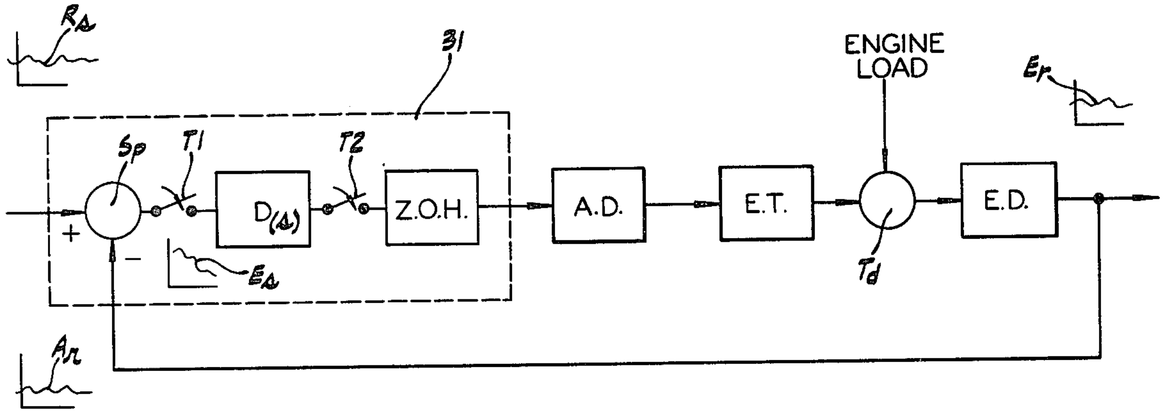
FIG. 5 is a block diagram of a closed-loop digital control system implemented by the apparatus of the present invention.
Figure 6:
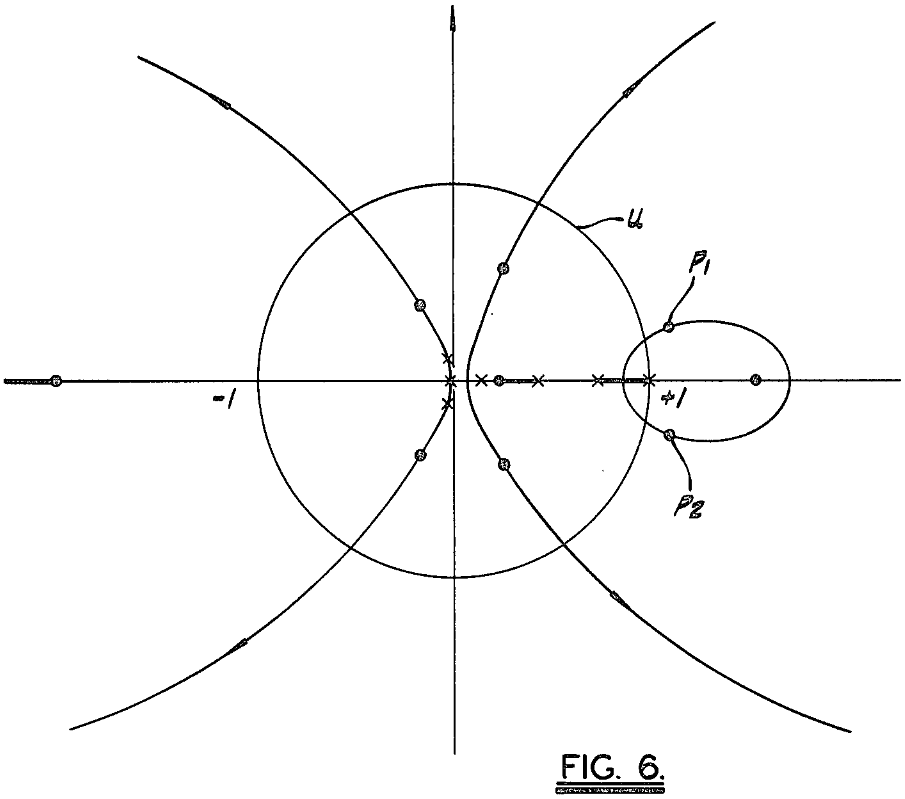
FIG. 6 is a root-locus diagram of the control system shown in FIG. 5.
Figure 7:
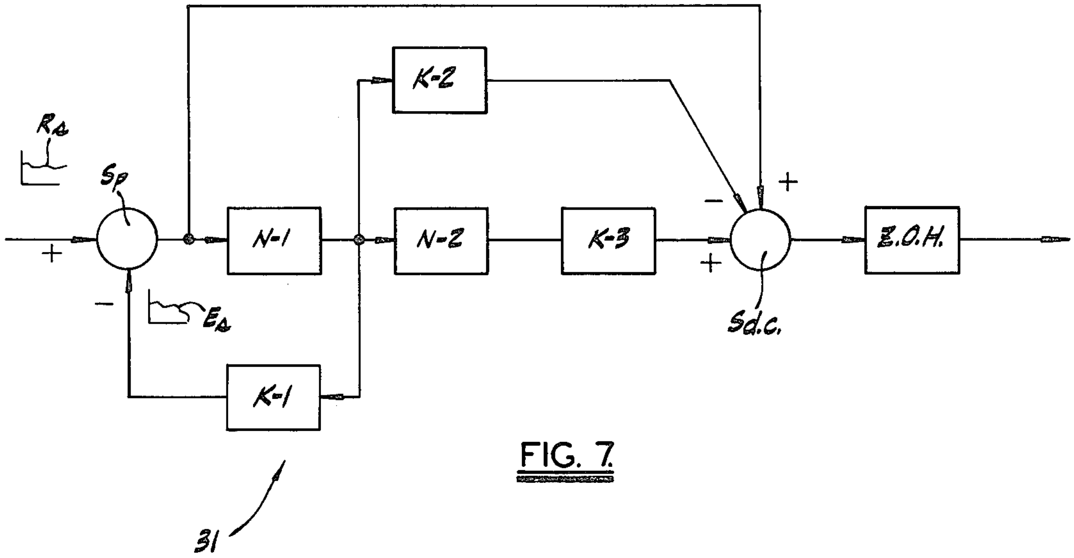
FIG. 7 is a block diagram for a portion of the apparatus of the present invention to increase stability of the system; and Corresponding reference characters indicate corresponding parts throughout the several views of the drawings.

Referring to FIGS. 5 through 7, the operation of apparatus 1 to automatically control idle speed is best understood when considered in conjunction with a transfer function derived for the engine on which the apparatus is installed. FIG. 5 is a block-diagram representation for a closed-loop digital control system which apparatus 1 incorporates. Starting at the left of the figure, a summing point Sp is used to develop an error signal $E_s$ which is the difference between the desired r.p.m. $R^s$ of engine 3 (expressed in radians/second) and the actual sensed r.p.m. of the engine $A_r$.

Controller 31 incorporates the following system parameters: switch T1 represents the frequency at which error signal $E_s$ is sampled; the box designated D(s) represents the dynamics of controller 31, switch $T_2$ represents the frequency at which control signal $S_c$ is supplied to d.c. motor 47; and the box designated Z.O.H. (for zero-order-hold) represents the latched output to the d.c. motor. Next, the box designated A.D represents the dynamics of d.c. motor 47 in responding to a control signal from the controller. The box designated E.T. represents engine torque. A second summing point Td is used to combine the resultant torque of engine 3 with any torque disturbance which is created when a load is placed on or removed from the engine. Engine torque, for example, is disturbed when the air conditioning system for the vehicle in which engine 3 is installed is turned on or off; or if the automatic transmission of the vehicle is engaged or disengaged. The last box designated E.D. represents the dynamics of engine 3 as based upon empirical data. The result is a signal $E_r$ which represents the actual r.p.m. of the engine.

Based upon data derived for each segment or element of the system an equation is written for each designated box and these are combined to generate an overall system equation. Such an equation is expressed as $$E_r/R_s = G/(1+G)$$

where $E_r$=actual engine r.p.m.

$R_s$=desired engine r.p.m.

G=system gain.

This equation can be expressed in a number of ways, for example, by using Z transforms. If this is done, and if the resulting equation is solved, a root-locus diagram such as shown in FIG. 6 is plotted in Z-plane. Such a solution and the resultant plot are based upon a given controller sampling rate. The root-locus diagram of FIG. 6 is for a solution to the control equation where the sampling rate is 50 milliseconds. It will be understood that the sampling rate may be other than this value. Those skilled in the mathematical arts will understand that the solutions to the equation represented by points P1 and P2 represent system instabilities because they lie outside the unity circle U. This means that the system comprised by apparatus 1 is unstable unless the instability is corrected. This correction is achieved by the design of controller 31 and specifically by having the controller function as a direct digital controller.

Referring to FIG. 7, controller 31 is represented in block diagram form wherein the blocks designated N-1 and N-2 respectively represent the next to last and second to last samples of the error signal $E_s$. The boxes designated K-1, K-2, and K-3 represent system constants built into the controller which permit the controller to stabilize operation of the overall systems. The set of constants K-1, K-2, and K-3 are unique to each type of engine 3 and thus their values for a six-cylinder engine, for example, differ from the values of the constants for a four cylinder engine. Proper determination of these values thus permit controller 31 to cancel the poles $P_1$ and $P_2$ in the FIG. 6 so a stable system is achieved. The summing point designated Sd.c. is the summing point at which the duty cycle for d.c. motor 47 is determined. This determination is made within microprocessor 33 as a result of processing signal $S_i$ and the microprocessor, once the determination is made, utilizes the results to generate control signal $S_c$.

As a method and in accordance with the above description, the method of the present invention comprises sensing the speed of engine 3 by a sensor 17 and developing an electrical signal $S_r$ representative of engine speed. Movement of throttle valve 9 from an open to a substantially closed position is sensed by a switch 21 and an electrical signal S indicative of throttle valve closure is generated. Electrical signal $S_r$ is processed by a controller 31 in accordance with a predetermined format based upon a transfer function derived for engine 3 and a control signal $S_c$ is generated. The processing of signal $S_r$ is done in response to signal $S_i$ indicating throttle valve 9 closure. And, throttle valve 9 is moved to a desired position at which engine idle speed is a preselected speed determined in accordance with the transfer function. Throttle valve movement is performed by an electromechanical means or d.c. motor 47 in response to control signal $S_c$.

In view of the above it will be seen that the several objects of the invention and other advantageous results are achieved.

As various changes could be made in the above construction and method without departing from the scope of the invention, it is intended that all the matter contained in the above description and shown in the accompanying drawings shall be interpreted as illustrative and not in a limiting sense.

What is claimed is:

1. A method for automatically controlling the idle speed of an internal combustion automobile engine having a carburetor mounted thereon for producing an air-fuel mixture combusted in the engine, the carburetor having an air passage through which air is drawn into the engine and a throttle valve for controlling the quantity of air so drawn, the engine further having an exhaust system for exhausting the products of combustion, the method comprising;

sensing the operating speed of the engine and developing an electrical signal representative thereof;

sensing movement of the throttle valve from an open to a substantially closed position and generating an electrical signal indicative thereof, closure of the throttle valve indicating the engine is operating at idle;

processing the electrical signal representing engine speed in accordance with a predetermined format based upon a transfer function derived for the engine and generating an electrical control signal, the processing being done in response to the electrical signal indicating throttle valve closure; and moving the throttle valve to a desired position at which engine idle speed is a preselected speed determined in accordance with the transfer function, throttle valve movement being done in response to the electrical control signal.

2. Apparatus for automatically controlling the idle speed of an internal combustion engine having an carburetor mounted thereon for producing an air-fuel mixture combusted in the engine, the carburetor having an air passage through which air is drawn into the engine and a throttle valve for controlling the quantity of air so drawn, the engine further having an exhaust system for exhausting the products of combustion, the apparatus comprising:

sensing means for sensing the operating speed of the engine at any one time and for developing an electrical signal representative thereof:

switch means for sensing movement of the throttle valve from an open to a substantially closed position and for generating an electrical signal indicative thereof, closure of the throttle valve indicating the engine is operating at idle;

controller means responsive to the electrical signal from the switch means for processing the electrical signal from the sensing means and for generating an electrical control signal, the controller means processing the electrical signal from the sensing means in accordance with a predetermined format based upon a transfer function derived for the engine, the controller means comprising a programmable microprocessor having a memory, the microprocessor being programmed to process the electrical signals in accordance with the predetermined format and generate the electrical signal; and, electromechanical means responsive to the control signal for moving the throttle valve to a desired position at which engine idle speed is a preselected speed determined in accordance with the transfer function, the controller means further including means responsive to digital output signals from the microprocessor for generating the control signals supplied to the electromechanical means, the signal generating means comprising a transistor bridge including four transistors two of which are energized when the electromechanical means is to operate the throttle valve in one direction and the other two of which are energerized when the electromechanical means is to allow the throttle valve to move in the opposite directions.

3. In apparatus for controlling the air-fuel ratio of an internal combustion engine having a carburetor attached thereto, the carburetor having an induction passage through which air is drawn into the engine, a throttle valve mounted in the passage and movable between a closed and an open position to control the quantity of air drawn into the engine, a fuel delivery system for delivering fuel from a source thereof to the induction passage for mixing with air to form an air-fuel mixture combusted in the engine, the engine having an exhaust system for exhausting the products of combustion, an oxygen sensor for sensing the amount of oxygen present in the products of combustion and for developing an electrical signal representative thereof, a controller for processing the electrical signal in a predetermined manner to determine if the air-fuel ratio of the mixture is a predetermind ratio, the controller producing an electrical signal to change the air-fuel ratio of the mixture to the predetermined ratio, and an electromechanical device responsive to the control signal for controlling the quantity of fuel delivered to the induction passage to control the air-fuel ratio of the mixture, the improvement comprising; sensing means for sensing the operating speed of the engine at any one time and for developing an electrical signal supplied to the controller; switch means for sensing movement of the throttle valve from an open to a substantially closed position and for generating an electrical signal indicative thereof which is supplied to the controller, the controller being responsive to the electrical signals from the switch means to process the electrical signal from the sensing means in accordance with a predetermined format based upon a transfer function derived for the engine; means for generating a second control signal as a result of the signal processing performed by the controller; electromechanical means responsive to the second control signal for moving the throttle valve to a desired position at which engine idle speed is a preselected speed determined in accordance with the transfer function; means for sensing the temperature of the engine and for developing an electrical signal representative thereof, the controller processing the electrical signal from the temperature sensing means together with the electrical signal from the speed sensing means to determine the idle speed at which the engine is to operate, the idle speed the engine operates at being a function of engine temperature; second switch means for sensing a load is placed on the engine and for developing an electrical signal representative thereof, the controller being responsive to an electrical signal from the second switch means in processing the electrical signal from the speed sensing means thereby to generate an electrical control signal by which the throttle valve is moved to a different desired position than that to which it would be moved if no load was placed on the engine; and, anti-dieseling means for preventing engine dieseling when the engine is shut off, the engine having an associated ignition system for starting the engine and turning it off and the anti-dieseling means including a switch actuated when the ignition system is turned off, actuation of the switch generating an electrical signal supplied to the controller, the controller being responsive to the electrical signal from the anti-dieseling means to generate a control signal supplied to the electromechanical means, the electromechanical means being responsive to this control signal to move the throttle valve to its fully closed position.

4. In apparatus for controlling the air-fuel ratio of an internal combustion engine having a carburetor attached thereto, the carburetor having an induction passage through which air is drawn into the engine, a throttle valve mounted in the passage and movable between a closed and an open position to control the quantity of air drawn into the engine, a fuel delivery system for delivering fuel from a source thereof to the induction passage for mixing with air to form an air-fuel mixture combusted in the engine, the engine having an exhaust system for exhausting the products of combustion, an oxygen sensor for sensing the amount of oxygen present in the products of combustion and for developing an electrical signal representative thereof, a controller for processing the electrical signal in a predetermined manner to determine if the air-fuel ratio of the mixture is a predetermined ratio, the controller producing an electrical control signal to change the air-fuel ratio of the mixture to the predetermined ratio, and an electromechanical device responsive to the control signal for controlling the quantity of fuel delivered to the induction passage to control the air-fuel ratio of the mixture, the improvement comprising: sensing means for sensing the operating speed of the engine at any one time and for developing an electrical signal supplied to the controller; switch means for sensing movement of the throttle valve from an open to a substantially closed position and for generating an electrical signal indicative thereof which is supplied to the controller, the controller being responsive to the electrical signals from the switch means to process the electrical signal from the sensing means in accordance with a predetermined format based upon a transfer function derived for the engine; means for generating a second control signal as a result of the signal processing performed by the controller; and, electromechanical means responsive to the second control signal for moving the throttle valve to a desired position at which engine idle speed is a preselected speed determined in accordance with the transfer function, the means for generating the second control signal comprising a transistor bridge responsive to digital signal outputs from the controller, the transistor bridge including four transistors, one in each arm of the bridge, two of the transistors being energized when the electromechanical means is to operate the throttle valve in one direction and the other two transistors being energized when the electromechanical means is to allow the throttle valve to move in the opposite direction.

5. Apparatus as set forth in claim 2 further including means for sensing the temperature of the engine and for developing an electrical signal representative thereof, the controller means processing the electrical signal from the temperature sensing means together with the electrical signal from the speed sensing means to determine the idle speed at which the engine is to operate, the idle speed the engine operates at being a function of engine temperature.

6. Apparatus as set forth in claim 2 further including second switch means for sensing when a load is placed on the engine and for developing an electrical signal representative thereof, the controller means being responsive to an electrical signal from the second switch means in processing the electrical signal from the speed sensing means thereby to generate an electrical control signal by which the throttle valve is moved to a different desired position than that to which it would be moved if no load was placed on the engine.

7. Apparatus as set forth in claim 6 wherein a vehicle in which the engine is installed has an air conditioning system and the second switch means includes a switch actuated when the air conditioning system is turned on.

8. Apparatus as set forth in claim 6 wherein a vehicle in which the engine is installed has an automatic transmission and the second switch means includes a switch actuated when the automatic transmission is engaged.

9. Apparatus as set forth in claim 2 further including means for sensing the vacuum level in the engine and for generating an electrical signal indicative of engine vacuum reaching a predetermined level.

10. Apparatus as set forth in claim 9 wherein the vacuum sensing means includes a switch actuated when engine vacuum reaches the predetermined level, actuation of the switch generating an electrical signal which is supplied to the controller means, the controller means being responsive to the electrical signal from the vacuum sensing means to generate a control signal supplied to the electromechanical means, the electromechanical means being responsive to the control signal to allow the throttle valve to move to a more fully open position.

11. Apparatus as set forth in claim 2 further including anti-dieseling means for preventing engine dieseling when the engine is shut off.

12. Apparatus as set forth in claim 11 wherein the engine has an associated ignition system for starting the engine and turning it off and the anti-dieseling means includes a switch actuated when the ignition system is turned off, actuation of the switch generating an electrical signal supplied to the controller means, the controller means being responsive to the electrical signal from the anti-dieseling means to generate a control signal supplied to the electromechanical means, the electromechanical means being responsive to this control signal to move the throttle valve to its fully closed position.

13. Apparatus as set forth in claim 2 wherein the controller means further includes an analog to digital converter for converting an analog electrical signal supplied to the controller means to a digital signal equivalent which becomes an input to the microprocessor.

14. Apparatus as set forth in claim 2 wherein the electromechanical means comprises a solenoid.

15. The improvement as set forth in claim 3 wherein the electromechanical means comprises a solenoid.

16. The improvement as set forth in claim 15 wherein the carburetor includes a throttle shaft on which the throttle valve is mounted and a throttle lever attached to one end of the throttle shaft and the solenoid has an extendible and retractive member which operates against the throttle lever to close the throttle valve or limit the extent of throttle valve closure.

17. The improvement as set forth in claim 3 further including an analog to digital converter for converting an analog electrical signal supplied to the controller to a digital signal equivalent which becomes an input to the controller.

18. The improvement as set forth in claim 3 further including means for sensing the vacuum level in the engine and for generating an electrical signal indicative of engine vacuum reaching a predetermined level.

19. The improvement as set forth in claim 18 wherein the vacuum sensing means includes a switch actuated when engine vacuum reaches the predetermined level, actuation of the switch generating an electrical signal which is supplied to the controller, the controller being responsive to the electrical signal from the vacuum sensing means to generate a control signal supplied to the electromechanical means, the electromechanical means being responsive to the control signal to allow the throttle valve to move to a more fully open position.

20. The improvement as set forth in claim 3 wherein a vehicle in which the engine is installed has an air conditioning system and the second switch means includes a switch actuated when the air conditioning system is turned on.

21. The improvement as set forth in claim 3 wherein a vehicle in which the engine is installed has an automatic transmission and the second switch means includes a switch actuated when the automatic transmission is engaged.

* * * * *